United States Patent
Mebane

(10) Patent No.: US 8,514,453 B2
(45) Date of Patent: Aug. 20, 2013

(54) METHOD FOR PROCESSING HIGH DYNAMIC RANGE IMAGES USING TONE MAPPING AND WCS COLOR TRANSFORMS

(75) Inventor: Waleed H. Mebane, Belmont, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 261 days.

(21) Appl. No.: 13/171,376

(22) Filed: Jun. 28, 2011

(65) Prior Publication Data

US 2013/0003129 A1    Jan. 3, 2013

(51) Int. Cl.
*G06T 5/00* (2006.01)
*G06T 5/40* (2006.01)
*H04N 1/40* (2006.01)
*H04N 1/60* (2006.01)
*G09G 5/02* (2006.01)

(52) U.S. Cl.
USPC .......... 358/2.1; 358/3.22; 358/3.24; 358/520; 358/525; 382/167; 382/274; 345/600; 345/604

(58) Field of Classification Search
None
See application file for complete search history.

(56) References Cited

U.S. PATENT DOCUMENTS 7,729,535 B2 *   6/2010   Henley ......................... 382/167

* cited by examiner

Primary Examiner — Tammy Pham
Assistant Examiner — Barbara Reinier
(74) Attorney, Agent, or Firm — Chen Yoshimura LLP

(57) ABSTRACT

A method for processing a high dynamic range (HDR) image for printing. Tone mapping is first applied to the input image to map the colors, to find an optimized range of brightness values, and to scale the color to place colors inside the optimized range (in-range colors) into a device color space (e.g. sRGB), but without clipping colors outside of the optimized range (out-of-range colors). The scaled colors are then converted to the color space of the output device (e.g. CMYK) using WCS (Windows Color System) color transform, where the in-range colors are processed using a optimized transform and the out-of-range are processed using a sequential transform. A mapping from the original color space to the converted color space for all colors in the image is stored in a lookup table (LUT), and the input image is converted to the output image using the LUT.

16 Claims, 1 Drawing Sheet

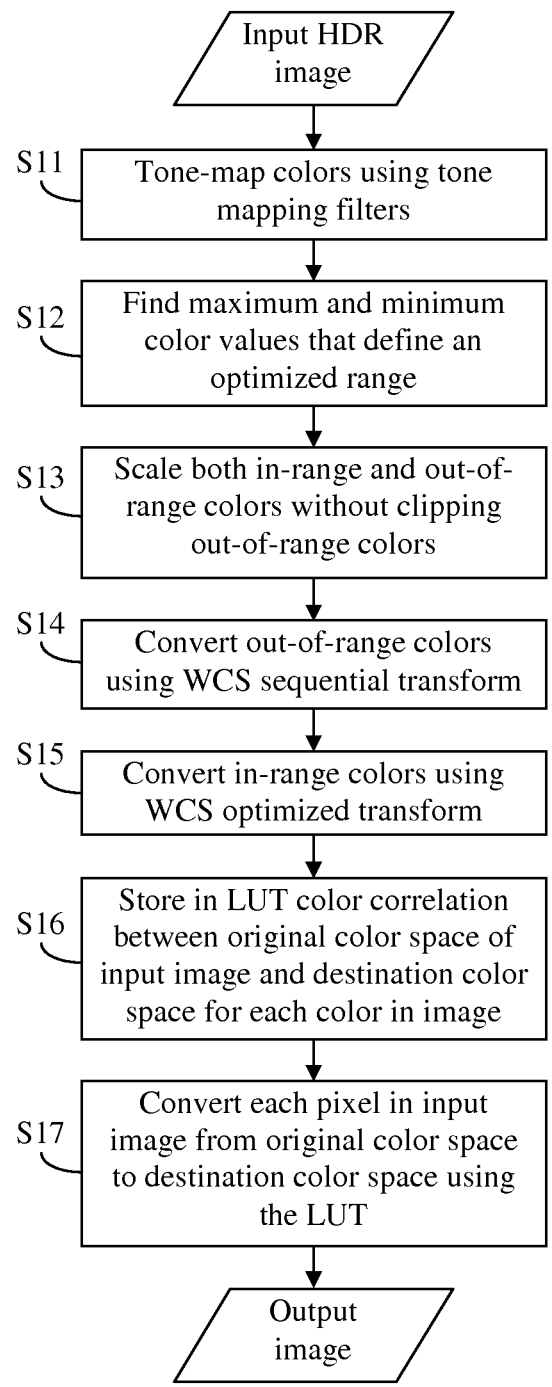

METHOD FOR PROCESSING HIGH DYNAMIC RANGE IMAGES USING TONE MAPPING AND WCS COLOR TRANSFORMS

BACKGROUND OF THE INVENTION

1. Field of the Invention

This invention relates to a method for processing high dynamic range images for printing, and in particular, it relates to such a method using tone mapping and subsequent processing by Windows Color System (WCS).

2. Description of Related Art

A high dynamic range (HDR) image is an image with a high contrast between the maximum and minimum brightness colors, for example, up to 10000:1 or higher. Non-HDR images typically have smaller dynamic ranges, such as 1000:1, 256:1, or less, and are usually represented as 256 shades of red, green, and blue, or of cyan, magenta, and yellow, device primaries. An example of an HDR image is a digital photograph, although HDR images can be acquired in a variety of ways including computer generated images.

In order to print an HDR image by a printer (referred to as an output device), the image must first be rendered into colors supported by the printer. Typically, the range of colors that it is possible to produce on a printer, with ink or toner, is much smaller than the range that can be captured by a camera (referred to as the input device) which measures amounts of light. This is because of the limit of brightness available with ink or toner versus the brightness of light and the sensitivity of digital capture devices, such as digital cameras, to such light. During printing, the much greater range of colors captured by the input device must be fitted into the smaller range that it is possible to print. The process of fitting colors from the input device into the range and specific contours representing the color capabilities of the output device (referred to as the color gamut) is generally referred to as gamut mapping.

A special problem exists when the input range is extremely large compared the output range. If the straightforward approach of simply scaling the input values to within the smaller range is attempted, many colors will become too dim to be seen, after scaling, and much of the subtle gradations between colors would also be lost. Another possible approach is clipping of out-of-range colors or a combination of clipping of extreme colors and scaling of less extreme colors. For some high dynamic range images, the clipping of some mid-range colors would result in problematic renderings that appear unrealistic, and the clipping of high-range colors may require more time to process.

A more sophisticated approach commonly referred to as "tone mapping" can be employed. Tone mapping generally refers to an image processing technique to map one set of colors to another in order to approximate the appearance of HDR images in a medium that has a more limited dynamic range. Many known tone mapping algorithms have been described. One particular example is an algorithm known as iCAM06, described in "iCAM06: A refined image appearance model for HDR image rendering," J. Kuang et al., J. Vis. Commun. Image R. 18 (2007) 406-414. In this algorithm, colors are tone mapped to roughly within the range of an intermediate destination device, and then scaled and clipped to the specific contours representing the color capabilities of the output device. However, the process of scaling and clipping can suffer from similar problems as noted above (the problems would just be limited to a smaller set of colors).

Windows Color System (WCS) is a color management scheme used on Windows Vista™ and later operating systems. WCS can convert colors from a source device to within the color gamut of a destination device (such as an output device). This conversion process includes gamut mapping. Using the programming interface to WCS, a preliminary step before converting colors is to create a color "transform". Two types of transform can be created, an optimized transform and a sequential transform. An optimized transform is created by applying gamut mapping and other color conversion steps to a sampling of colors within the gamut of the source device. The information obtained in that step and encapsulated in the transform can then be used to convert specific colors of an image by estimating an appropriate value by interpolation of nearby colors in the converted sample set. In other words, it is a kind of lookup table. On the other hand, in a sequential transform, all steps of the conversion process are applied sequentially to each color in the image, and estimation is not required.

SUMMARY

As discussed above, two types of color transform can be created in WCS, the optimized transform and the sequential transform. Color conversions using an optimized transform are fast, often much faster than using the sequential transform, but those using sequential transforms are more accurate. Ordinarily, for a low dynamic range image, the difference in accuracy is insignificant, especially when compared with the difference in processing speed. This is because the sampling of colors used to create the optimized transform can be densely distributed over the range of a normal, low dynamic range, source device. However, there is a special problem in the case of high dynamic range input. The inventor has discovered that an optimized transform created for a high dynamic range input device uses samples which are either limited to the normal (low-dynamic) range or are only sparsely distributed over the extended range of high dynamic range images. As a result, the estimation of an appropriate output color for a given very bright (or very dark) color, in the extended range area, may be based on sampled colors in the normal range, possibly very far away from the color of interest. In such a case, the estimation is likely to be inaccurate and to produce poor results. Another possibility is that, although there are color samples in the extended range area, they are sparsely distributed and so are far away from some or many of the colors of interest to be converted; in which case, the result, likewise, is likely to be inaccurate.

It would be desirable to gain the benefit of color accuracy possible with the sequential transform, but with the benefit of high processing speed that is possible using the optimized transform.

Accordingly, the present invention is directed to a method for processing HDR images for printing that substantially obviates one or more of the problems due to limitations and disadvantages of the related art.

An object of the present invention is to provide a process for printing HDR images that achieves high color accuracy and fast processing speed.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a computer implemented method for processing an input high dynamic range (HDR) image to generate an output image to be output by an output device, the method including: mapping colors of the input HDR image from a first color space to a second color space using a tone-mapping filter; determining an optimized range for the mapped colors in the second color space, wherein a predetermined percentage of colors in the second color space are in-range colors having color values falling within the optimized range, and other colors are out-of-range colors having color values falling outside of the optimized range; scaling the colors from the second color space to a third color space such that the in-range colors fill a pre-defined volume of the third color space after scaling; converting the colors from the third color space to a fourth color space defined by the output device, including: converting in-range colors using a WCS (Windows Color System) optimized transform; and converting out-of-range colors using a WCS sequential transform; storing a correlation between the colors of the input HDR image in the first color space and the converted colors in the fourth color space; and for each pixel in the input HDR image, converting its color from the first color space to the fourth color space using the stored correlation, whereby the output image is generated.

In another aspect, the present invention provides a computer implemented method for processing an input high dynamic range (HDR) image to generate an output image to be output by an output device, the method including: determining an optimized range of colors in the input HDR image, wherein a first plurality of colors of the input HDR image are in-range colors having color values falling within the optimized range, and other colors of the input HDR image are out-of-range colors having color values falling outside of the optimized range; scaling the colors of the input HDR image to a second color space such that the in-range colors fill a pre-defined volume of the second color space after scaling; converting the colors from the second color space to a third color space defined by the output device, including: converting in-range colors using a WCS (Windows Color System) optimized transform; and converting out-of-range colors using a WCS sequential transform; storing a correlation between the colors of the input HDR image and the converted colors in the third color space; and for each pixel in the input HDR image, converting its color to the third color space using the stored correlation, whereby the output image is generated.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 1 schematically illustrates an image processing method for high dynamic range images according to an embodiment of the present invention.

DETAILED DESCRIPTION OF PREFERRED EMBODIMENTS

Embodiments of the present invention may be implemented by software stored in a storage medium and executed by a processor of a data processing apparatus. Preferably, it is implemented as a part of a printer driver program stored and executed on a computer connected to a printer. The invention is useful in computers that use the WCS color management scheme; it may also be useful in computers that use another color management scheme that has similar characteristics as WCS in pertinent aspects as will be understood from the descriptions in this disclosure.

In an image processing method according to embodiments of the present invention, prior to WCS color transform processing, a range is defined and input colors are identified as being either in-range or out-of-range. For convenience, the range is referred to as the "optimized range" in this disclosure. Then those colors which are in-range are processed using a WCS optimized transform, and those colors which are out-of-range are processed using a WCS sequential transform. Using this approach, colors which are in-range benefit from having their conversion based on densely distributed color samples which have been previously processed and encapsulated as a result in the optimized transform. The estimation of an appropriate output color can be reasonably accurate. For the remaining, out-of-range colors, the sequential transform is used to ensure a good result. Considerations are given to ensuring that the number of colors processed using the sequential transform is small, just those colors essential to a good reproduction, so that the improvement to processing speed resulting from using the optimized transform for the majority of colors can be realized.

The image processing method may be applied to HDR images obtained by digital cameras, computer graphics software, etc. The output device may be a printer, a computer monitor, a projector, etc.

FIG. 1 illustrates a method according to an embodiment of the present invention for processing an HDR image for printing by a printer. First, a tone mapping operator is applied to the input image data to tone-map the input colors from the original color space to an intermediate color space (e.g., an extended RGB space) (step S11), to find maximum and minimum brightness values that define an optimized range in the intermediate color space (step S12), and to scale both in-range and out-of-range colors so as to place the in-range colors into a low-dynamic range device color space (e.g. sRGB) but without clipping the out-of-range colors (step S13).

As commonly used in the field, the term "tone mapping operator" refers to a tone mapping algorithm, which includes a mapping of colors using tone mapping filters, and typically also includes subsequent steps such as scaling, clipping, etc. In a preferred embodiment of the present invention, a modified iCAM06 algorithm is used as a tone mapping operator to implement steps S11, S12 and S13, where the clipping step of the iCAM06 algorithm is not performed.

In an unmodified iCAM06 algorithm, after the color values are mapped using filters, the algorithm finds a maximum value for which 99% of all colors in the image are equally bright or less bright under a predefined brightness measure (i.e. the 99th percentile), and a minimum value for which 1% of all colors in the image at equally bright or less bright (i.e., the 1st percentile). The algorithm removes the colors outside of the range defined by the maximum and minimum values (i.e. clipping), and scales the colors between the maximum and minimum values to fill the space of sRGB (i.e. scaling or normalization). As commonly understood by those skilled in the art, when a collection of color is said to "fill" a space, it is meant that the colors are mapped with sufficient expansion (or contraction) so that they are contained within the space but occupy as much of the space as feasible. It does not mean that every point within the space is occupied by a color of collection of colors.

In the flow of FIG. 1, the part of the iCAM06 algorithm that finds the maximum and minimum values is applied in step S12, and the part that scales the in-range color is applied in step S13 to scale both in-range and out-of-range colors, but the part of the algorithm that clips the out-of-range colors is not applied. Thus, both in-range colors and out-of-range colors remain after step S13. The maximum and minimum values found by the algorithm define the optimized range for subsequent steps.

When finding the maximum and minimum values in the RGB space, iCAM06 uses the largest one of the R, G and B values of each color as a brightness measure. In other words, 99% of all colors in the image have the largest one of their R, G and B values equal to or less than the maximum value, and 1% of all colors in the image have the largest one of their R, G and B values equal to or less than the minimum value.

The color data produced by step S13 is preferably in the RGB format as floating point numbers (rather than 8-bit numbers). For convenience, the colors produced by step S11 are referred to as the tone-mapped colors in this disclosure.

As mentioned earlier, in a preferred embodiment, steps S11, S12 and S13 are implemented by modifying a program that implements iCAM06. The program may be further modified so that the optimized range is other than a 1% to 99% range. For example, a 2% to 98% range may be used. Although details of the iCAM06 algorithm are not described here, based on the descriptions given here and publicly available documentations of iCAM06, those skilled in the art will be able to implement step S11 without undue experimentation.

Other suitable tone mapping algorithms, such as Reinhard02, Durand02 and Tumblin/Rushmeier, may also be used to implement step S11.

In an alternative implementation, a modified iCAM06 algorithm is only used to implement step S11, and the part of iCAM06 that finds the maximum and minimum colors and scales the color to sRGB space is not performed. Then, the tone-mapped colors generated by step S11 are converted to a second intermediate color space, such as Jab, CIE L*a*b* or CIE L*u*v*. In this color space, the color data are analyzed to find the maximum and minimum color values that define an optimized range (step S12). This step may be similar to the step of iCAM06 that finds the maximum and minimum values, but is performed in a different color space. The colors are scaled in the second intermediate color space (step S13), preferably by making the in-range colors fill a pre-defined volume of that color space. The color is then converted to the low-dynamic range device color space (e.g. sRGB, CMYK, etc.) (this step is not shown in FIG. 1).

Regardless of the specific implementations and the various color conversions that may be involved, the key functions of steps S11, S12 and S13 are to tone-map the original colors and to divide the tone-mapped colors into in-range colors and out-of-range colors, without clipping any colors.

Then, the tone-mapped colors produced by steps S11 to S13 are converted to the gamut of the destination device using WCS color transforms. Specifically, the in-range colors are converted using a WCS optimized transform (step S15). This step includes creating a WCS optimized transform in the ordinary way, for example, as described in the WCS documentation published by Microsoft. WCS performs the transform to calculate the colors by interpolation. The out-of-range colors are converted using a WCS sequential transform (step S14). This step includes creating a WCS sequential transform in the ordinary way, for example, as described in the WCS documentation published by Microsoft. The order of steps S14 and S15 is not important. The conversions in steps S14 and S15 convert colors from a source gamut to a destination gamut as defined by the color transforms. The source color space is preferably RGB, and the destination color space may be CMYK if the destination device is a printer.

In some implementations, it may be desirable to perform step S13 (scaling) and S14 (WCS sequential transform) using one plugin software module. It is also possible to perform these two steps using only WCS functions (i.e. without a plugin).

A correlation between the colors generated by step S13 (referred to as the tone-mapped colors in this disclosure) and the transformed colors in destination color space is stored (step S16). This may be done by maintaining a lookup table (LUT) storing pairs of colors. Note that this LUT should not be confused with the LUT used in the optimized transform itself.

Then, in step S17, the tone-mapped HDR image (from step S13) is converted to an output image having colors in the destination color space. For each pixel in the tone-mapped image, the color of the pixel is converted to the destination color space by looking up in the LUT, and stored as the color of that pixel in the output image. The output image is built up in this way.

To summarize, in the method described above, to ensure that the number of out-of-range colors is small, tone mapping and scaling are combined, where the scaling factor is chosen to place a majority of the colors within the normal range of the low dynamic range device. Then the sequential transform is used to handle the outlying colors. The initial tone mapping step reduces the problems associated with scaling.

In an alternative embodiment, steps S11 to S13 are replaced by the following process. First, an optimized range in the original HDR color space is found, which defines which colors are in-range colors and which colors are out-of-range colors, without using a tone mapping algorithm. The optimized range is a mid-range of colors, beyond the normal low-dynamic range, but where color samples of an appropriately defined optimized transform can still be somewhat dense. A scaling or normalization process is applied to the colors of the original HDR image so that the in-range colors fill a predefined color space (e.g. sRGB), but without clipping of colors. Then, WCS optimized transform is used for the in-range colors and WCS sequential transform is used for the out-of-range colors to transform the colors, as in steps S14 and S15, and the subsequent steps S16 and S17 are also performed.

The image processing method according to embodiments of the present invention can achieve many desirable results. It is able to preserve more detail of the image, when compared with using an optimized transform for all conversions. Colors do not become as dark as compared with scaling operations used in conjunction with purely optimized transforms. Artifacts affect fewer colors because the mapping does not have to be based on interpolation between neighboring colors which may have been affected.

It will be apparent to those skilled in the art that various modification and variations can be made in the HDR image processing method of the present invention without departing from the spirit or scope of the invention. Thus, it is intended that the present invention cover modifications and variations that come within the scope of the appended claims and their equivalents.

What is claimed is:

1. A computer implemented method for processing an input high dynamic range (HDR) image to generate an output image to be output by an output device, the method comprising:
   mapping colors of the input HDR image from a first color space to a second color space using a tone-mapping filter, wherein a predetermined percentage of colors in the second color space are in-range colors having color values falling within an optimized range, and other colors are out-of-range colors having color values falling outside of the optimized range;
   converting the colors from the second color space to a third color space defined by the output device, including:
      converting in-range colors using a WCS (Windows Color System) optimized transform; and
      converting out-of-range colors using a WCS sequential transform;
   storing a correlation between the colors of the image in the second color space and the converted colors in the third color space; and
   for each pixel in the image, converting its color from the second color space to the third color space using the stored correlation, whereby the output image is generated.

2. The method of claim 1, wherein the second color space is sRGB and the third color space is CMYK, and wherein the output device is a printer.

3. The method of claim 1, wherein the mapping step includes:
   applying the tone-mapping filter to map colors of the input HDR image from the first color space to an intermediate color space;
   determining the optimized range in the intermediate color space; and
   scaling the colors from the intermediate color space to the second color space such that the in-range colors fill a pre-defined volume of the second color space after scaling.

4. The method of claim 1, wherein the mapping step includes:
   applying the tone-mapping filter to map colors of the input HDR image from the first color space to a first intermediate color space;
   converting the colors from the first intermediate color spate to a second intermediate color space;
   determining the optimized range in the second intermediate color space;
   scaling the colors in the second intermediate color space such that the in-range colors fill a pre-defined volume of the second intermediate color space after scaling; and
   converting the colors from the second intermediate color space to the second color space.

5. The method of claim 4, wherein the second intermediate color space is Jab.

6. The method of claim 1, wherein the correlation is stored in a lookup table.

7. The method of claim 1, wherein the optimized range is defined by a maximum value for which 99% of all colors in the image are equally bright or less bright under a pre-defined brightness measure, and a minimum value for which 1% of all colors in the image at equally bright or less bright under the pre-defined brightness measure.

8. A computer implemented method for processing an input high dynamic range (HDR) image to generate an output image to be output by an output device, the method comprising:
   determining an optimized range of colors in the input HDR image, wherein a first plurality of colors of the input HDR image are in-range colors having color values falling within the optimized range, and other colors of the input HDR image are out-of-range colors having color values falling outside of the optimized range;
   scaling the colors of the input HDR image to a second color space such that the in-range colors fill a pre-defined volume of the second color space after scaling;
   converting the colors from the second color space to a third color space defined by the output device, including:
      converting in-range colors using a WCS (Windows Color System) optimized transform; and
      converting out-of-range colors using a WCS sequential transform;
   storing a correlation between the colors of the input HDR image and the converted colors in the third color space; and
   for each pixel in the input HDR image, converting its color to the third color space using the stored correlation, whereby the output image is generated.

9. A computer program product comprising a computer usable non-transitory medium having a computer readable program code embedded therein for controlling a data processing apparatus, the computer readable program code configured to cause the data processing apparatus to execute a process for processing an input high dynamic range (HDR) image to generate an output image to be output to an output device, the process comprising:
   mapping colors of the input HDR image from a first color space to a second color space using a tone-mapping filter, wherein a predetermined percentage of colors in the second color space are in-range colors having color values falling within an optimized range, and other colors are out-of-range colors having color values falling outside of the optimized range;
   converting the colors from the second color space to a third color space defined by the output device, including:
      converting in-range colors using a WCS (Windows Color System) optimized transform; and
      converting out-of-range colors using a WCS sequential transform;
   storing a correlation between the colors of the image in the second color space and the converted colors in the third color space; and
   for each pixel in the image, converting its color from the second color space to the third color space using the stored correlation, whereby the output image is generated.

10. The computer program product of claim 9, wherein the second color space is sRGB and the third color space is CMYK, and wherein the output device is a printer.

11. The computer program product of claim 9, wherein the mapping step includes:
   applying the tone-mapping filter to map colors of the input HDR image from the first color space to an intermediate color space;
   determining the optimized range in the intermediate color space; and
   scaling the colors from the intermediate color space to the second color space such that the in-range colors fill a pre-defined volume of the second color space after scaling.

12. The computer program product of claim 9, wherein the mapping step includes:

applying the tone-mapping filter to map colors of the input HDR image from the first color space to a first intermediate color space;

converting the colors from the first intermediate color spate to a second intermediate color space;

determining the optimized range in the second intermediate color space;

scaling the colors in the second intermediate color space such that the in-range colors fill a pre-defined volume of the second intermediate color space after scaling; and converting the colors from the second intermediate color space to the second color space.

13. The computer program product of claim 12, wherein the second intermediate color space is Jab.

14. The computer program product of claim 9, wherein the correlation is stored in a lookup table.

15. The computer program product of claim 9, wherein the optimized range is defined by a maximum value for which 99% of all colors in the image are equally bright or less bright under a pre-defined brightness measure, and a minimum value for which 1% of all colors in the image at equally bright or less bright under the pre-defined brightness measure.

16. A computer program product comprising a computer usable non-transitory medium having a computer readable program code embedded therein for controlling a data processing apparatus, the computer readable program code configured to cause the data processing apparatus to execute a process for processing an input high dynamic range (HDR) image to generate an output image to be output to an output device, the process comprising:

determining an optimized range of colors in the input HDR image, wherein a first plurality of colors of the input HDR image are in-range colors having color values falling within the optimized range, and other colors of the input HDR image are out-of-range colors having color values falling outside of the optimized range;

scaling the colors of the input HDR image to a second color space such that the in-range colors fill a pre-defined volume of the second color space after scaling;

converting the colors from the second color space to a third color space defined by the output device, including:
    converting in-range colors using a WCS (Windows Color System) optimized transform; and
    converting out-of-range colors using a WCS sequential transform;

storing a correlation between the colors of the input HDR image and the converted colors in the third color space; and for each pixel in the input HDR image, converting its color to the third color space using the stored correlation, whereby the output image is generated.

* * * * *